United States Patent [19]

Hengst

[11] 4,119,517
[45] Oct. 10, 1978

[54] APPARATUS FOR PURIFYING WATER

[75] Inventor: Bernd Hengst, Schweinfurt am Main, Germany

[73] Assignee: Sachs-Systemtechnik GmbH, Schweinfurt am Main, Germany

[21] Appl. No.: 804,562

[22] Filed: Jun. 8, 1977

[30] Foreign Application Priority Data

Jun. 14, 1976 [DE] Fed. Rep. of Germany ....... 2626572

[51] Int. Cl.² ........................... C25B 9/00; C02B 1/82
[52] U.S. Cl. .................................... 204/229; 204/271; 204/276; 204/149; 204/152
[58] Field of Search ................. 204/271, 275–276, 204/149, 228–229; 210/243

[56] References Cited

U.S. PATENT DOCUMENTS

| 3,095,365 | 6/1963 | Green | 204/229 |
| 3,751,355 | 8/1973 | Mandroian | 204/228 |
| 4,061,556 | 12/1977 | Reis et al. | 204/271 |

FOREIGN PATENT DOCUMENTS 868,314 12/1941 France ........................... 204/271

*Primary Examiner*—John H. Mack
*Assistant Examiner*—D. R. Valentine
*Attorney, Agent, or Firm*—Hans Berman

[57] ABSTRACT

The casing of apparatus for purifying water encloses a chamber and is formed with two orifices spaced from the chamber in opposite directions and communicating with the same for gravity flow of the water to be purified from one of the orifices through the chamber and out of the other orifice. Two electrodes spacedly mounted in the chamber for flow of the water therebetween are conductively connected to an electric battery in the casing by circuitry which causes current to flow between the electrodes through the water when the water and the battery satisfy proper conditions for the functioning of the apparatus, such conditions being indicated by a sensible signal. A compartment in the casing, sealed from the electrode chamber, encloses almost all the circuitry.

13 Claims, 4 Drawing Figures

APPARATUS FOR PURIFYING WATER

This invention relates to the purification of water by anodic oxidation of organic matter suspended or dissolved in the water, and particularly to apparatus for purifying water so as to make it fit for human consumption.

It is known that the passage of direct current between two electrodes through water contaminated by microorganisms causes the microorganisms and other organic impurities to be destroyed at the anode. The efficiency of the electrolytic purification process depends on operating variables being monitored continuously and kept within relatively narrow limits. Because of the necessary instrumentation and operator's skill, successful electrolytic water purification plants heretofore were stationary installations on an industrial scale. Yet, there is a need for mobile water purification equipment capable of handling raw water batches greatly varying in their properties, yet simple enough to be operated by unskilled personnel and without need for observation of measuring instruments and decisions based on the instrument readings.

It is a primary object of this invention to provide a self-contained purification apparatus capable of reliably destroying microorganisms in raw water, which is portable, foolproof, and automatic in its operation.

With this object and others in view, the invention provides apparatus for purifying water by anodic oxidation whose casing encloses a chamber communicating with two orifices in the casing which are spaced from the chamber in opposite directions. The casing may be supported in an operative position in which the orifices are vertically spaced for gravity flow of the water to be purified from one orifice through the chamber to the other orifice. Two electrodes spacedly mounted in the chamber for flow of the water therebetween may be connected to an electric battery in the casing for passage of electric current between the electrodes through the water when the water and the battery satisfy certain conditions. The circuitry connecting the electrodes to the battery includes a signal generating device which generates a sensible signal indicative of the presence of such conditions. A compartment in the casing sealed from the electrode chamber encloses at least a portion of the circuitry.

The apparatus briefly described is independent of external energy sources although it may use them where available. It is suitable, therefore, for use by travelers and campers. The electrical circuitry is designed to make best use of the built-in energy source and to achieve adequate purification of the treated water over a wide range of water compositions. The operator obtains all necessary guidance from a single and simple signaling device without need for special training.

Other features, additional objects, and many of the attendant advantages of this invention will readily be appreciated from the following detailed description of a preferred embodiment when considered in connection with the appended drawing in which.

Figure 1:
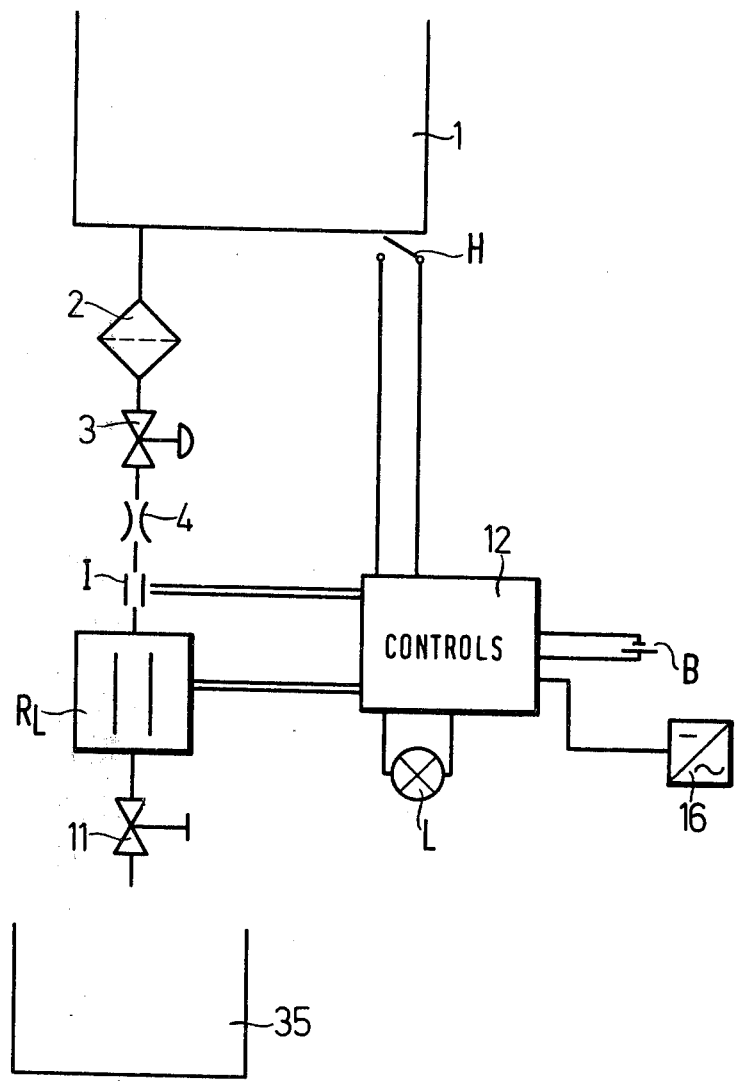
FIG. 1 is a flow sheet diagrammatically illustrating the cooperation of the mechanical and electrical components of water purification apparatus of the invention.

Referring initially to FIG. 1, there is shown a container 1 for the water to be purified. A filter 2 communicates with the bottom of the container 1 for gravity flow of the water from the container through the filter, a shut-off valve 3, and a throttling passage 4 into an electrolytic cell $R_L$. Current flow through the water in the cell $R_L$ is controlled by a control unit 12 which is energized by a battery B or an AC line adapter 16 including a rectifier. The treated water is discharged from the cell $R_L$ by another shut-off valve 11 into a receptacle 35.

As will presently be described in more detail, a pilot lamp L conductively connected to the unit 12 lights up when conditions are proper for functioning of the apparatus. A flow indicator I in the path of the water between the throttling passage 4 and the cell $R_L$ deactivates the unit 12 in the absence of flowing water. A main switch H is operated by the container 1.

Figure 2:
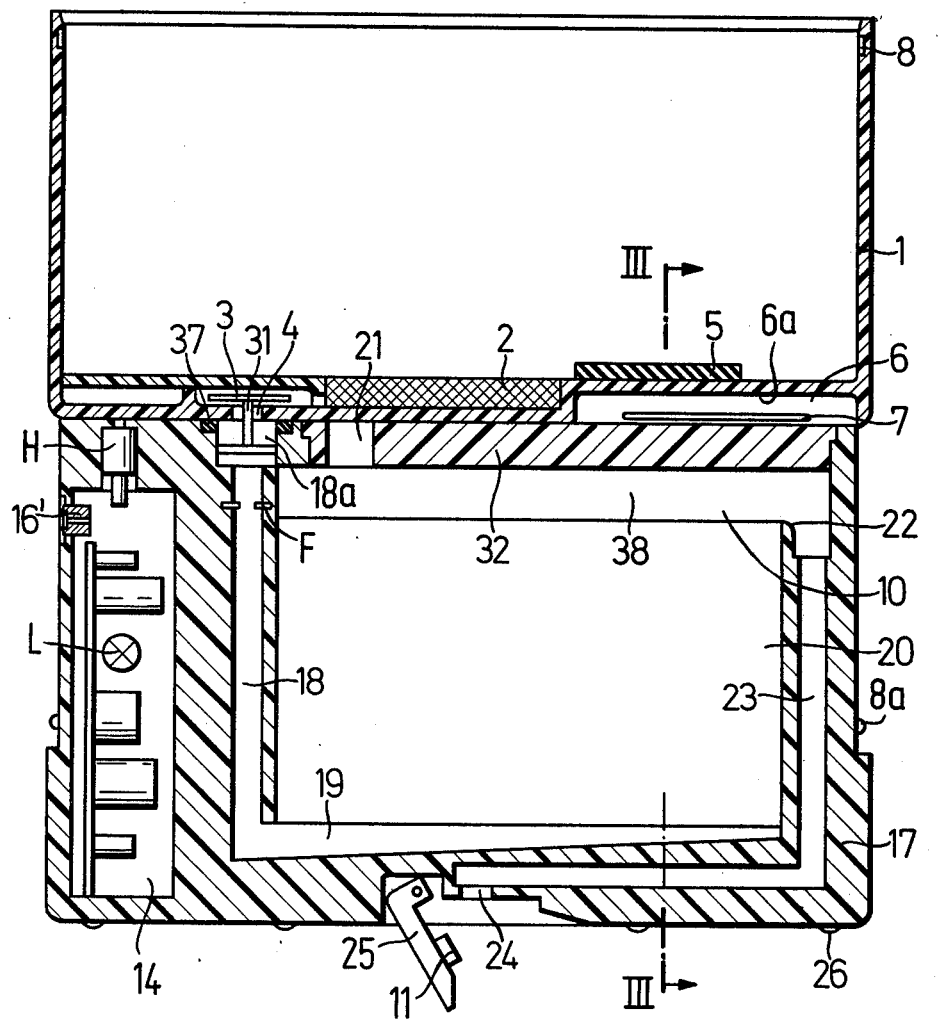
FIG. 2 shows the apparatus in side-elevational section through its main casing on the line II — II in FIG. 3, a cover being shown in the open or operative position.
Figure 3:
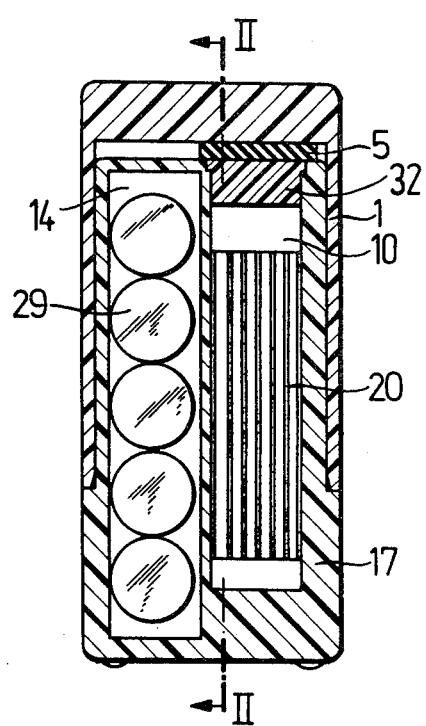
FIG. 3 illustrates the same apparatus in front elevational section through the main casing on the line III — III in FIG. 2, the cover being shown in the closed or inoperative condition.

The container 1 is shown in FIGS. 2 and 3 to be a generally rectangular plastic box open in one direction. In the position of FIG. 2 the open side of the container 1 is directed upward. When inverted into the position seen in FIG. 3, the container provides a cover for the plastic main casing 17 of the apparatus. The wall of the container or cover 1 opposite the open side, hereinafter referred to as the bottom wall, is formed with a recess 6a in its outer face which is engaged by a locating rib 6 on a top wall section 32 of the main casing 17. Lateral, elongated projections 7 on the rib 6 resiliently engage mating grooves (not shown) in walls of the recess 6a to maintain alignment between the container or cover 1 and the casing 17 in the operative condition of the apparatus seen in FIG. 1.

The afore-mentioned filter 2 is a pad of bleached cellulose fibers set flush into an upwardly open, shallow recess in the bottom wall of the cover 1. The recess communicates with a valve chamber in the bottom wall in which a leaf spring 3 is held as a valve against an orifice of the vertical throttling passage 4 by its own resiliency when the cover is lifted from the position shown in FIG. 2.

The lower orifice of the passage 4 is aligned with the enlarged top orifice 18a of a vertical intake channel 18 in the casing 17. A pin 31 mounted in the orifice 18a by means of an integral spider projects upward beyond the top face of the casing 17 and lifts the valve spring 3 from the passage 4 when the cover 1 is engaged with the ribs 6. Two flow sensing electrodes F of the flow indicator I project from opposite walls into the intake channel 18 closely subjacent the orifice 18a.

The channel 18 leads into the bottom portion of a chamber 10 bounded by wall elements of the casing 17. Seven flat stainless-steel sheets 20 are mounted upright in parallel, spaced relationship in the chamber 10, the upright edges of the sheets 20 being received in grooves of the plastic, insulating casing material, as is conventional in itself and not explicitly shown. They constitute the electrodes of the electrolytic cell $R_L$. The wall of the chamber 10 opposite the channel 18 has an overflow edge 22 flush with the top edges of the sheets 20 and lower than the electrodes of the flow indicator I. The overflow edge 22 leads into a discharge channel 23 which terminates in an orifice 24 in the bottom wall of the casing 17. An arm 25 pivotally mounted in a downwardly open recess of the casing bottom wall carries the afore-mentioned valve 11, a resilient plug which may be inserted by hand in the orifice 24 with a friction fit.

The water supplied to the chamber 10 by the channel 18 enters an intake manifold portion 19 of the chamber 10 below the electrodes 20, rises in paralled streams between the electrodes 20, and the streams are again combined in a discharge manifold portion 38 of the chamber 10 above the electrodes 20. The cover section 32 which upwardly bounds the discharge manifold portion 38 is releasably set into the casing 17 and may be removed for access to the chamber 10 if needed. An aperture 21 in the section 32 permits the escape of gases formed by electrolysis between the sheets 20 and not dissolved in the discharged water through a minute gap between the cover 1 and the section 32. A resilient O-ring 37 is partly recessed in the top rim of the orifice 18a. It is compressed by engagement of the cover bottom wall and seals the passage 4 to the orifice 18a.

A compartment 14 in the casing 17 is sealed from the chamber 10 and contains most elements of the control unit 12, also the five dry-cells 29 which jointly constitute the battery B. The actuating member of the main switch H is spring biased toward the open switch position in which it projects upward from the casing 17 until depressed by the cover 1 into the closed position shown in FIG. 2. The pilot lamp L and a female connector 16' for the AC line adapter 16 are mounted in external walls of the compartment 14. The connector 16' includes a selector switch K which disconnects the battery B from the unit 12 when the adapter 16 is plugged in as will presently be described.

A pad 5 of elastomeric material is mounted in the cover 1 next to the filter 2. When the cover 1 is turned 180° in the plane of FIG. 2 and slipped over the casing 17 into the position shown in FIG. 3, the pad 5 seals the orifice 18a and the aperture 21. The cover 1 is held in the closing or inoperative position of FIG. 3 by projections 8a on the casing which engage recesses 8 in the cover 1 (FIG. 2). When the plug 11 is inserted in the orifice 24, no water remaining in the apparatus can be spilled.

As far as described above, the water purification apparatus is operated in the following manner. The cover 1 is turned from the position of FIG. 3 to the operative position of FIG. 2, and the casing is set on a container, such as a sheet metal can, in such a manner that the orifice 24 is located above an opening in the can. Integrally molded supporting feet 26 on the bottom of the casing 17 prevent slipping of the apparatus from alignment of the orifice 24 with the can opening.

Water to be purified is fetched in the cover 1 or poured from another container into the cover 1 while the latter is seated on the casing 17. The valve spring 3 being lifted from the throttling passage 4 by the pin 31, water can flow through the filter pad 2 into the chamber 10 at a rate controlled mainly by the flow section of the passage 4. The main switch H is closed by the cover 1 and causes current to pass through the water in the chamber 10. The water so purified is discharged from the orifice 24 into the sheet metal can represented in FIG. 1 by the container 35.

When all water has left the cover 1, the absence of conductive water between the electrodes of the flow indicator I causes the power supply to the electrodes 20 to be shut off, as will be described hereinbelow even though the main switch H remains closed as long as the cover 1 remains in the position of FIG. 2, and unnecessary current drain from the battery B through the water remaining in the chamber 10 is avoided.

Figure 4:
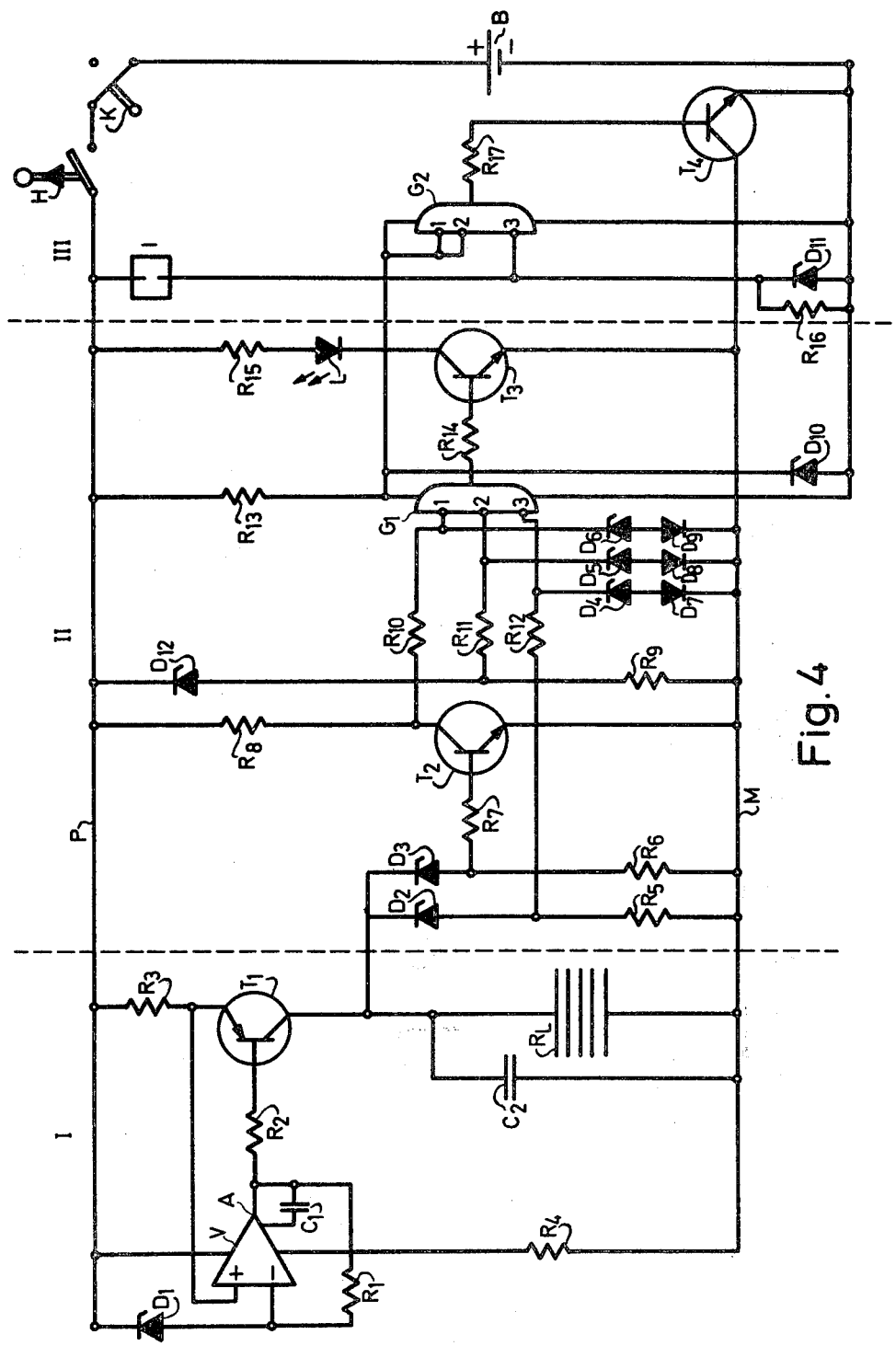
FIG. 4 is a schematic diagram of the electrical components of the apparatus.

The control unit 12 is shown in FIG. 4 together with associated elements of the purification apparatus described hereinabove. It keeps the current flowing through the cell $R_L$ between the electrodes 20 at a constant value and de-energizes the pilot lamp L, a light-emitting diode, if the voltage across the cell $R_L$ is above or below a desired range due to unusually high conductivity or lack of adequate conductivity of the water between the electrodes 20. High conductivity is generally indicative of water rich in dissolved salts and not drinkable for this reason. If the conductivity of the water is unusually low, an adequate current flow for anodically destroying microorganisms cannot be maintained. The pilot lamp L is also de-energized by the control unit, if the battery voltage is too low.

The unit 12 has a positive line P and a ground line M. Line P is connected through the main switch H and two contacts of the selector switch K to the positive terminal of the battery B if the AC line adapter is not used. In the other position of the selector switch K, the line P is connected to the receptacle 16' for connection to the line adapter 16 (see FIG. 1). The negative terminal of the battery B is not directly connected to the ground potential of line M. For easier understanding, the circuit of FIG. 4 may be divided into three building blocks, I, II, III, which will be discussed separately below.

Unit 1 contains the cell $R_L$ and the circuit for maintaining the current through the cell constant. One electrode 20 of cell $R_L$ is connected to ground potential, another one is connected to the collector of a transistor $T_1$ whose emitter is connected through a fixed resistor $R_3$ to the positive supply line P. The other electrodes are spacedly interposed between the connected electrodes and are bi-polar during operation of the cell $R_L$. Resistor $R_3$, emitter-collector circuit of transistor $T_1$ and cell $R_L$ together constitute a voltage divider. The resistance of resistor $R_3$ is fixed, while the resistances of the cell and of the emitter-collector circuit of transistor $T_1$ are variable. The base voltage of transistor $T_1$ is controlled by the output of a difference amplifier V. The direct input of difference amplifier V is connected to the emitter of transistor $T_1$ while the inverting input receives a reference signal from a constant voltage source comprising a Zener diode $D_1$ which is operated in the blocked state. A feedback resistor $R_1$ is connected from the output to the inverting input of difference amplifier V. It linearizes the transfer characteristics of difference amplifier V. A base current limiting resistor $R_2$ is connected between the output of amplifier V and the base of transistor $T_1$. A capacitor $C_1$ in conjunction with resistor $R_1$ prevents oscillations in difference amplifier V. Difference amplifier V energized through a direct connection to the positive supply line P and a connection to ground potential through a resistor $R_4$. Resistor $R_4$ also provides negative current feedback when transistor $T_1$ saturates. Capacitor $C_2$, connected in parallel with cell $R_L$ suppresses noise voltages and voltage spikes. Unit I operates as follows:

If water flows through cell $R_L$, current flows from line P through resistor $R_3$, the emitter-collector circuit of transistor $T_1$ and cell $R_L$ to ground potential. The current required for proper sterilization depends upon the size of the cell, the distance between its electrodes, etc. and is known for any given cell. The voltage drop across resistor $R_3$ for this current is determined, and the Zener diode $D_1$ is selected to correspond to this drop. Difference amplifier V compares the voltage across diode $D_1$ to the drop across resistor $R_3$ and, if a difference is present, controls the internal resistance of the emitter-collector circuit of transistor $T_1$ until the difference becomes zero. The current through cell $R_L$ therefor remains substantially constant. The gain of difference amplifier V is reduced by resistor $R_1$ sufficiently that a linear characteristic is obtained over the normal range of water conductivities.

If the internal resistance of the cell becomes too high, that is, if the water flowing therethrough is either chemically very pure and therefore has a low conductivity, or if a line to the cell breaks, the difference amplifier furnishes a base voltage to transistor $T_1$ which causes it to saturate. A very high battery current then flows from line P through resistor $R_3$, the emitter-base circuit of transistor $T_1$, and amplifier V to ground. Resistor $R_4$, however, limits the current flowing through the amplifier to a maximum safe value.

Unit II contains the circuitry for furnishing a visual indication when the equipment is ready for operation.

The conductivity of the water is monitored by monitoring the voltage across the cell $R_L$. A practically constant current through the cell being maintained, the voltage across the cell is a function of the conductivity. Two threshold circuits, one containing a Zener diode $D_2$ and a resistor $R_5$, the other containing a Zener diode $D_3$ and a resistor $R_6$, are connected in parallel with the cell for this purpose. The light-emitting diode in the pilot lamp L is connected through a resistor $R_{15}$ to line P and through the emitter-collector circuit of a transistor $T_3$ to ground potential. The conductivity state of transistor $T_3$ and therefore the energization of diode L are controlled by the output of a gate $G_1$. Gate $G_1$ is an AND gate whose output is connected through a resistor $R_{14}$ to the base of transistor $T_3$. As long as the conductivity of the water is in the normal range and the battery voltage above a given minimum value, AND gate $G_1$ furnishes an output which causes transistor $T_3$ to conduct, thereby energizing diode L. Diode L furnishes a green light which indicates that the whole system is in proper operating condition. If so desired, the circuit can be arranged in a known manner so that diode L extinguishes under proper operating conditions and furnishes a red light to indicate improper operating conditions.

Zener diode $D_2$ monitors the upper permissible conductivity limit in the water to be purified. If the conductivity increases above this limit, Zener diode $D_2$ blocks, the voltage at the third input of gate $G_1$ goes to ground potential, and no output is furnished by gate $G_1$, thereby causing transistor $T_3$ to block. Diode L is deenergized. The lower conductivity limit is monitored by means of Zener diode $D_3$. As the voltage across cell $R_L$ increases beyond a prescribed value, Zener diode $D_3$ breaks down, causing transistor $T_2$ to become conductive. The emitter of transistor $T_2$ is directly connected to ground potential, while its collector is connected through a resistor $R_8$ to the positive line P. The resistance of resistor $R_8$ is high relative to the resistance of the collector-emitter circuit of transistor $T_2$ when the latter is fully conductive. Under these conditions, the input of AND gate $G_1$ is connected substantially to ground potential and AND gate $G_1$ blocks. Transistor $T_3$ becomes non-conductive and diode L is again extinguished.

The battery voltage is monitored by a series circuit comprising a Zener diode $D_{12}$ and a resistor $R_9$ connected between the positive line and ground potential. The common point of Zener diode $D_{12}$ and resistor $R_9$ is connected through a resistor $R_{11}$ to the second input of AND GATE $G_1$. When the voltage across diode $D_{12}$ sinks below the minimum battery voltage, diode $D_{12}$ blocks, input 2 of AND gate $G_1$ receives a logic "0" signal, AND gate $G_1$ blocks, and diode L is again deenergized.

Zener diodes $D_4$, $D_5$ and $D_6$ are connected between the third, second and first inputs of AND gate $G_1$ and ground to protect the AND gate from excessively high input voltages. Resistors $R_{10}$, $R_{11}$ and $R_{12}$ serve as current limiting resistors. Connected between Zener diodes $D_4$, $D_5$ and $D_6$ and ground potential are, respectively, diodes $D_7$, $D_8$ and $D_9$, but with opposite polarity. The function of these diodes will be explained in detail in connection with the operation of unit III.

Unit III contains the voltage source for the apparatus as well as a load disconnect for energy conservation. The negative terminal of battery B is connected to the emitter of a switching transistor $T_4$ whose collector is connected to the ground line M. When transistor $T_4$ blocks, there is no connection between the battery B and the ground line M, and all circuits whose current returns through the ground line are deenergized. The circuit for disconnecting the battery B from the ground line includes the flow indicator I in the intake channel 18 to the cell $R_L$. If water is present in the channel 18, the internal resistance of the indicator I drops sharply. Since it is connected in series with the parallel combination of a resistor $R_{16}$ and a Zener diode $D_{11}$, a voltage divider circuit is formed which causes the voltage at the common point of flow indicator I and resistor $R_{16}$ to increase sharply when the internal resistance of the indicator drops. This increase in voltage is transmitted through an AND gate $G_2$ to the base of transistor $T_4$ which then becomes conductive, causing the remainder of the apparatus to be energized. The AND gate $G_2$ is supplied with voltage from the positive line P through a resistor $R_{13}$ and from the negative terminal of the battery B by a direct connection. AND gate $G_2$ is thus energized independently of the switching state of transistor $T_4$. Diode $D_{11}$ limits the maximum voltage applied to the input of AND gate $G_2$. Zener diode $D_{10}$ in conjunction with resistor $R_{13}$ stabilizes the supply voltage for AND gates $G_1$ and $G_2$. The above-mentioned diodes $D_7$, $D_8$ and $D_9$ protect the inputs of AND gate $G_1$ if transistor $T_4$ does not become fully conductive. In this case, the voltage difference existing between ground potential and the negative side of battery B would, in the absence of diodes $D_7$–$D_8$, cause AND gate $G_1$ to become conductive. However when diodes $D_7$–$D_8$ are blocked, the potential at the ground line cannot be applied to the inputs of AND gate $G_1$.

The range of water conductivity for proper operation of the circuit is approximately 100 $\mu S$ to 2,000 $\mu S$ (one siemens or S = 1 mho). The circuit of flow indicator I responds to conductivities exceeding approximately 100 $\mu S$.

Several features make the illustrated apparatus advantageous for mobile use and for the purification of raw waters of unknown and varying composition. The built-in batteries permit operation where no line current is available. The disinfecting effect is closely related to the current density at the anodic electrode surfaces. The surface area of the electrodes being constant, a precisely controlled current density is maintained by the supplied constant current. When the desired current density cannot be maintained because of insufficient or excessive conductivity of the treated water, the apparatus automatically signals the operator, thereby warning against excessive drain on the batteries and insufficient treatment of the water. The dwell time of the water in the electrolytic cell is controlled by the throttling passage 4 and varies within narrow limits as the water level in the cavity of the cover 1 changes. Gross solid impurities are retained in the filter 2, and fouling of the electrodes is prevented.

It has been found that the water flowing upward between the electrodes 20 from the intake manifold portion 19 to the discharge manifold portion 38 causes particles coagulated by anodic oxidation to settle in the chamber 10. They may be flushed from the chamber 10 after extended use after removal of the top wall section 32.

The cover 1, when turned into the position shown in FIG. 3 and receiving a major portion of the casing 17 in its cavity, prevents contamination of all orifices in the top wall of the casing, the only orifice in the casing bottom wall being sealed by the plug 11. When the cover 1 is taken off, the power supply for the electrolytic cell is automatically switched on. When the cover is inverted into the inoperative or closed position, the power supply is switched off, and the actuating element of the main switch is protected in the cover cavity against accidental operation.

The casing 17 has the shape of a rectangular prism. It is supported in its operative position either on the projecting feet 26 or on its outer bottom surface which is bounded by the longest and shortest edges of the prism and facilitates setting the casing on receptacles or containers greatly varying in size.

It should be understood, of course, that the foregoing disclosure relates only to a preferred embodiment and that it is intended to cover all changes and modifications of the example of the invention herein chosen for the purposes of the disclosure which do not constitute departures from the spirit and scope of the invention set forth in the appended claims.

What is claimed is:

1. Apparatus for purifying water by anodic oxidation comprising:
   (a) a casing enclosing a chamber therein and being formed with two orifices spaced from said chamber in opposite directions, said orifices communicating with said chamber;
   (b) support means for supporting said casing in an operative position in which said orifices are vertically spaced for gravity flow of the water to be purified from one of said orifices through said chamber to the other orifice;
   (c) two electrodes spacedly mounted in said chamber for flow of said water therebetween;
   (d) an electric battery in said casing;
   (e) circuit means in said casing connecting said battery to said electrodes for passage of electric current between said electrodes through said water when said water and said battery satisfy predetermined conditions,
      (1) said circuit means including signal generating means for generating a sensible signal indicative of the voltage across said electrodes being between predetermined maximum and minimum values,
      (2) said casing bounding a compartment therein sealed from said chamber, said compartment enclosing at least a portion of said circuit means.

2. Apparatus as set forth in claim 1, wherein said signal generating means include means for generating said signal in response to a predetermined output voltage of said battery.

3. Apparatus as set forth in claim 1, wherein said sensible signal is a light signal.

4. Apparatus as set forth in claim 1, wherein said chamber, in said position of said casing, has a top portion vertically adjacent said one orifice and a bottom portion vertically adjacent said other orifice, said casing including an intake channel connecting said one orifice to said bottom portion, a discharge channel communicating with said other orifice, and overflow means connecting said top portion to said discharge channel.

5. Apparatus as set forth in claim 4, further comprising flow sensing means in said intake channel at a level above said overflow means, said circuit means including means operatively connected to said flow sensing means for disconnecting said electrodes from said battery in the absence of water sensed by said flow sensing means in said intake channel at said level.

6. Apparatus as set forth in claim 1, further comprising shut-off valve means on said casing for closing said other orifice.

7. Apparatus for purifying water by anodic oxidation comprising:
   (a) a casing enclosing a chamber therein and being formed with two orifices spaced from said chamber in opposite directions, said orifices communicating with said chamber;
   (b) support means for supporting said casing in an operative position in which said orifices are vertically spaced for gravity flow of the water to be purified from one of said orifices through said chamber to the other orifice;
   a cover member bounding a cavity therein,
      (1) said cavity being open in one direction and dimensioned for conformingly receiving a portion of said casing,
      (2) said cover member including a bottom wall portion bounding said cavity in a direction opposite to said one direction,
      (3) said bottom wall portion being formed with a passage therethrough communicating with said cavity;
   (d) aligning means for setting said cover member on said casing in a position of alignment in which said passage is aligned with said one orifice of the casing;
   (e) two electrodes spacedly mounted in said chamber for flow of said water therebetween;
   (f) an electric battery in said casing;
   (g) circuit means in said casing connecting said battery to said electrodes for passage of electric current between said electrodes through said water when said water and said battery satisfy predetermined conditions,
      (1) said circuit means including signal generating means for generating a sensible signal indicative of the presence of said conditions,
      (2) said casing bounding a compartment therein sealed from said chamber, said compartment enclosing at least a portion of said circuit means.

8. Apparatus as set forth in claim 7, further comprising a valve member in said passage, resilient means biasing said valve member toward a position in which said valve member blocks said passage, and valve opening means on said casing for moving said valve member away from said position thereof when said cover is set on said casing in said position of alignment.

9. Apparatus as set forth in claim 7, wherein said bottom wall portion carries a sealing element in said cavity, said sealing element sealingly engaging said orifice when said portion of the casing is received in said cavity.

10. Apparatus as set forth in claim 7, further comprising a main switch interposed between said battery and said circuit means, and switch actuating means on said casing for closing said switch in response to the setting of said cover member in said position of alignment.

11. Apparatus as set forth in claim 10, wherein said actuating means include an actuating member partly projecting from said portion of said casing when said switch is open.

12. Apparatus as set forth in claim 7, further comprising a filter mounted on said bottom wall portion and interposed between said cavity and said passage.

13. Apparatus as set forth in claim 2, wherein a portion of said passage is of restricted flow section for throttling the flow of water from said cavity to said one orifice.

* * * * *